Nov. 7, 1967

K. W. HEMPHILL ET AL 3,351,831

MOTOR SPEED CONTROL UTILIZING LIGHT
SENSITIVE CONDUCTIVE AND RESISTIVE
ELEMENTS

Filed Dec. 28, 1964

INVENTOR.
KENT W. HEMPHILL
JOSEPH P. DONNOLO
BY
ATTORNEYS

INVENTOR.
KENT W. HEMPHILL
JOSEPH P. DONNOLO
ATTORNEYS

United States Patent Office 3,351,831
Patented Nov. 7, 1967

3,351,831
MOTOR SPEED CONTROL UTILIZING LIGHT SENSITIVE CONDUCTIVE AND RESISTIVE ELEMENTS
Kent W. Hemphill, Rochester, and Joseph P. Donnolo, Ontario, N.Y., assignors to Xerox Corporation, Rochester, N.Y., a corporation of New York
Filed Dec. 28, 1964, Ser. No. 421,296
8 Claims. (Cl. 318—77)

ABSTRACT OF THE DISCLOSURE

A motor speed control system for synchronizing the shaft speed of one or more electric motors to the shaft speed of a reference motor utilizing light and rotating disks to measure the speed of the motor shafts and light sensitive conductive and resistive elements to generate and apply an error signal to the electric motors to maintain the speed of the electric motors in synchronization with that of the reference motor.

---

This invention relates to motor speed control and more particularly to the automatic synchronization of one or more direct current motors with a reference motor.

Industrial requirements for operating electric motors in close synchronization are widespread. To cite one illustrative example: in certain commercial xerographic machines used for producing permanent copies from microfilm subjects it is necessary to maintain a constant speed relationship between various motor-driven elements. Specifically, drum rotation and microfilm transport must be synchronized to achieve proper exposure of the sensitized photoconductive surface to an optical image, and drum rotation and paper feed must be synchronized for proper registration in transferring the developed image to the paper. For reasons of economy and their adaptability to accurate control, the drum rotation, microfilm transport and paper feed mechanisms in the aforementioned machines are desirably driven by three separate direct current shunt wound motors.

Thus, in the example cited, as well as in many other commercial machines, optimum results depend on synchronization of electric motors within close tolerances. However, in addition to the problem of operating various motor-driven components in a properly timed sequence, there is the problem of rapidly and accurately changing the rotational speeds of the other electric motors as the rotational speed of the reference motor varies. Corrections must be applied continuously and nearly instantaneously as the rotational speed of the reference motor varies due, for example, to power supply disturbances or to changes in load. Moreover, since commercial machines must typically operate over a wide range of predetermined production rates, variable rather than fixed speed motors are preferably used. Thus, an initial speed selection means for the various motors is also desirable.

Automatic synchronization of one or more electric motors with a reference motor is therefore a principal object of this invention.

Speed control of multiple direct current shunt wound motors over a range of 20% to 100% of rated speed by a single control is also an object of the present invention. Additional objects include, among others: an electronic-optical speed control system for controlling the speed of two or more motors within a speed variation range of about 0.1%; a motor control system capable of miniaturization; and, means and methods for synchronizing the drum rotation motor and paper drive motor in xerographic copying machines.

These and other objects as will be apparent from a reading of this specification are achieved by the apparatus and methods comprising the present invention. Briefly summarized, the present invention includes means to produce optical signals having frequencies corresponding to the shaft rotational speeds of a reference motor and one or more electric motors to be synchronized with it, and means to convert the optical signals into electrical signals. Comparator means receive the electrical signals and produce an error signal whenever the motors are not in synchronization. Elements in the control unit supplying current to the motor to be controlled respond to the error signals and, in turn, vary the speed of the motor to achieve synchronization. Specific embodiments of the present invention may be employed as hereinafter described to achieve continuous automatic and precise motor speed control.

The present invention is described in detail in connection wtih the accompanying drawings in which.

In the following description of the present invention, the reference motor will be referred to as the "master" motor and the electric motors automatically synchronized to the master will be referred to as "slave" motors.

Figure 1:
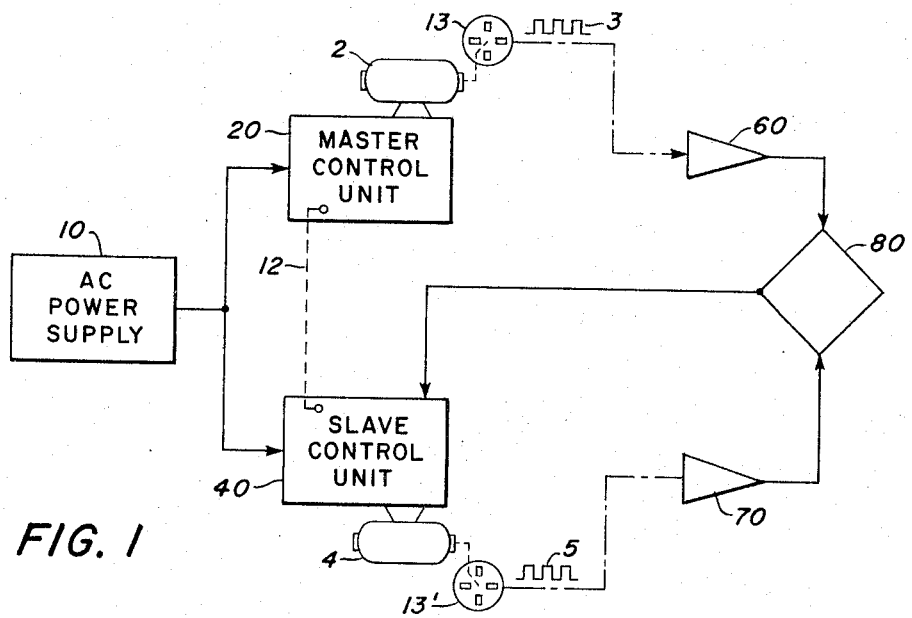
FIG. 1 is a block diagram schematically representing the functional arrangement of elements comprising the preferred embodiment of the present invention for synchronizaing a DC shunt wound motor with a reference motor.

In FIG. 1, a block diagram illustrates the functional arrangement of the elements comprising a motor speed synchronization system according to the present invention. A more detailed description of the various elements will be given in connection with subsequent figures. Although a single slave motor is included in the system illustrated, more than one slave may be included in the automatic speed control system associated with a master motor, as will be clear from the following description.

Master motor 2 and slave motor 4 are electrically connected to a source of power, such as AC power supply 10, by means of master control unit 20 and slave control unit 40, respectively. The control units contain the necessary rectifiers and circuit means for suitably energizing the motors which are preferably DC shunt wound motors. In addition, slave control unit 40 includes means to vary the current supplied to the slave motor in response to error signals automatically produced in the system. Units 20 and 40 are desirably interconnected, as shown by means of mechanical linkage 12, for automatic rough synchronization of initial motor speed settings. Although the arrangement illustrated is preferred for reasons of economy and ease of control, separate power sources may be employed if desired.

Referring to the master motor branch of the schematic, means 13 are provided to monitor motor 2 and produce an optical reference signal 3 coresponding to the shaft rotational speed of motor 2. By means of a light sensitive component, master amplifier unit 60 receives optical signal 3 and converts it into an electrical signal. The signal is amplified and fed into comparator 80 adapted and connected to receive the output of both amplifier units 60 and 70.

Similarly, with reference to the slave motor branch shown in the schematic, means 13' produces optical speed signal 5 corresponding to the shaft rotational speed of slave motor 4. Signal 5 is received by amplifier unit 70 and converted into an electrical signal which is also simplified and fed into comparator 80.

It is noted that the present invention is not limited to optical speed monitoring means. For example, electrical or magnetic speed sensing means may be incorporated in the present invention to produce signals corresponding to the shaft rotational speeds of the rotors, and these signals may be electrically rather than optically, linked to the amplifier units.

Whenever electrical comparison of the electrical signals fed into comparator 80 indicate motors 2 and 4 are not synchronized, an electrical error signal is produced at comparator 80 and fed back to slave control unit 40. In response to the error signal, the speed of the slave motor is automatically increased or decreased as necessary to achieve synchronization with the master.

The system illustrated in FIG. 1 may be adapted to accommodate more than one slave motor by incorporating additional branches for each slave, including control unit, amplifier unit and comparator. In systems having more than one slave, the output of master amplifier unit 60 would be fed into each comparator for the production of error signals applicable to the respective slave control units. Synchronization of all slave motors employed would thereby be achieved. Components required for the additional branches, and their operation, would be the same as those described in connection with the illustrated embodiment.

Figure 2:
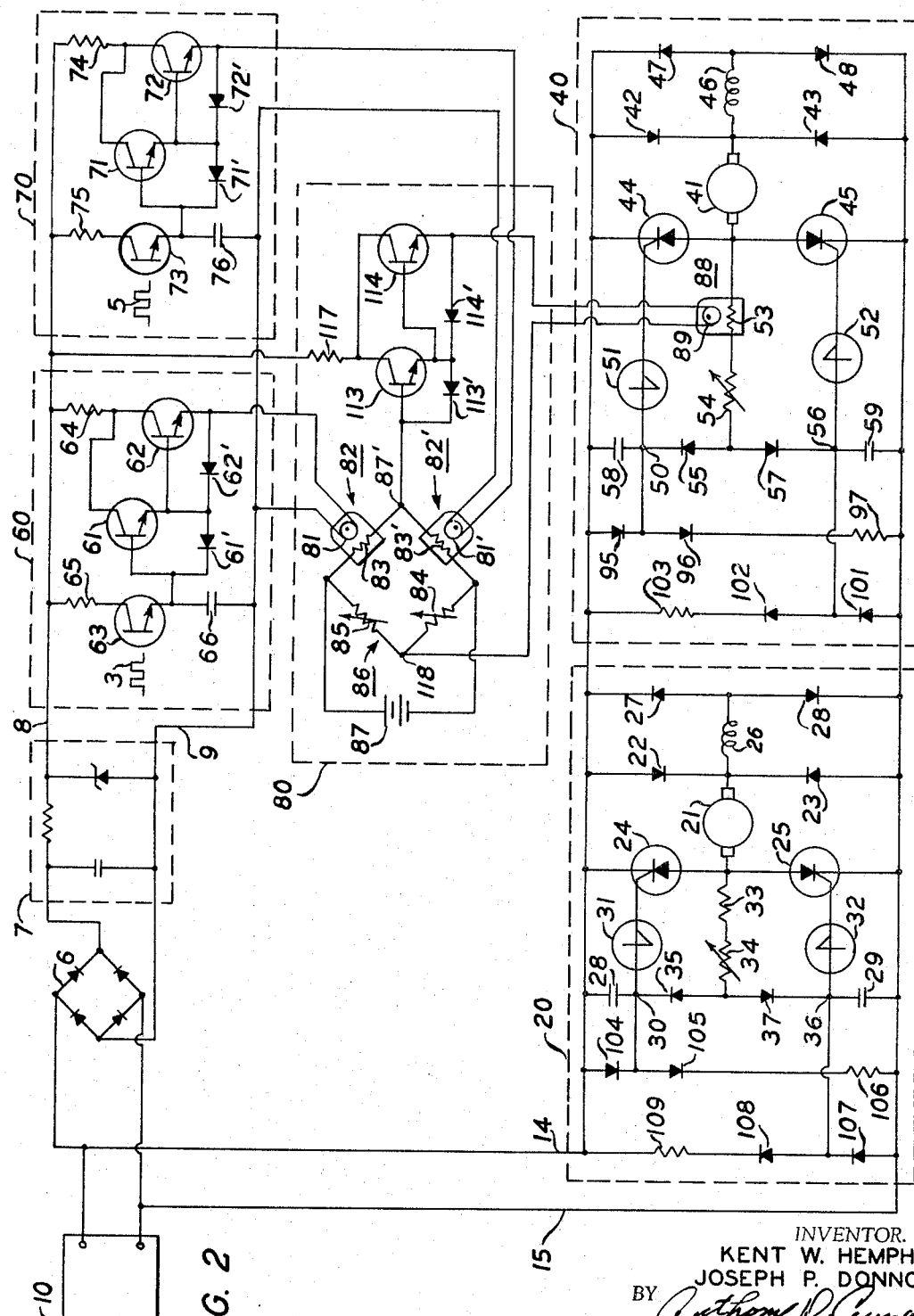
FIG. 2 is a circuit diagram for the preferred embodiment of the present invention.

FIG. 2 is a circuit schematic for the preferred embodiment of the present invention. Where appropriate for purposes of explanation, the components of the system elements shown in FIG. 1 are enclosed within broken lines in FIG. 2 and identified by the same reference numerals.

With particular reference to control units 20 and 40, the electrical connections for the motors are connected across power lines 14 and 15 by means of full wave rectifier bridges made up of rectifier diodes and semiconductor controlled rectifiers. As shown, slave motor armature 41 is connected across power lines 14 and 15 by means of rectifier diodes 42 and 43 via the anode and cathode electrodes of controlled rectifiers 44 and 45. Slave motor field winding 46 is connected across the power lines by means of rectifier diodes 42, 43, 47 and 48. Power lines 14 and 15 are connected to a suitable power source, such as 117 volt AC power supply 10.

A charging path for capacitor 58, connected between power line 14 and junction 50, is provided by diode 43, armature 41, resistive elements 53 and 54, steering diode 55 and junction 50. A charging path for capacitor 59 comprises: diode 42, armature 41, resistive elements 53 and 54, steering diode 57 and junction 56.

Considering the power half-cycle during which power line 14 is positive, capacitor 59 becomes charged and then discharges into trigger diode 52, connected to the gate electrode of controlled rectifier 45, causing controlled rectifier 45 to fire. Similarly, when power line 15 is positive, capacitor 58 becomes charged through its aforementioned charging path, and then discharges into trigger diode 51 connected to the gate electrode of controlled rectifier 44, causing controlled rectifier 44 to fire.

As the charging times for capacitors 58 and 59 are dependent upon the combined resistance of elements 53 and 54 and the back E.M.F. of armature 41, current flow through the controlled rectifiers and, in turn, motor speed, is easily altered by varying the resistance of either or both of elements 53 and 54.

Element 54 comprises a variable potentiometer linked (by means of mechanical linkage 12 shown in FIG. 1) to a similar circuit element in master control 20. Thus, the electrical resistance of element 54 is suitably adjusted as an initial speed setting is made for the master motor.

Element 53 comprises a light sensitive element having an electrical resistance dependent upon incident illumination. In operation, as hereinafter described in detail, the resistance of element 53 is determined by light bulb 89 which is responsive to error signals received from comparator 80. Thus, after an initial speed setting has been made (establishing a given resistance for element 54) variations in the electrical resistance of element 53 in response to signals automatically generated in the present system can be used to synchronize the speed of slave motor 4 with that of master motor 2.

Diodes 55 and 57 are included in control unit 40 to prevent reverse current flow through the armature. As shown in the circuit schematic, electrical discharge paths for capacitors 58 and 59 are provided by branches comprising diodes 95 and 96 and resistor 97, and diodes 101 and 102 and resistor 103.

Similar circuitry provided in master control unit 20 functions in the same way as that described for slave control unit 40. As shown in the schematic: charging paths for capacitors 28 and 29 include rectifier diodes 22 and 23, armature 21, resistive elements 33 and 34, steering diodes 35 and 37, and junctions 30 and 36. Capacitor 28 is connected through junction 30 to trigger diode 31 which, in turn, is connected to the gate electrode of controlled rectifier 24. Capacitor 29 is connected through junction 36 to trigger diode 32, which, in turn, is connected to the gate electrode of controlled rectifier 25. The electrical discharge paths for the capacitors included in the master control unit 20 are made up of diodes 104 and 105 and resistor 106, and diodes 107 and 108 and resistor 109, respectively.

As FIG. 2 illustrates, master control unit 20 and slave control unit 40 are identical with the exception of one electrical resistive element included in the respective controlled rectifier firing circuits. Specifically, element 33 in master control unit 20 comprises a fixed resistor, whereas element 53 in slave control unit 40 comprises a light sensitive element having an electrical resistance dependent upon incident illumination. For example, in the preferred embodiment 53 is a photocell included in an electro-optical circuit component 88 including a light bulb, represented at 89.

Figure 3:
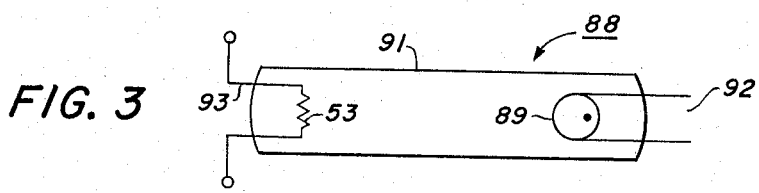
FIG. 3 illustrates an electro-optical circuit component employed in the preferred embodiment of the present invention; and, FIG. 4 illustrates a light chopper usable in connection with the present invention for producing light signals corresponding to shaft rotation speed.

FIG. 3 schematically illustrates the details of electro-optical circuit component 88 used in the preferred embodiment of the present invention. Components of the type illustrated are marketed under the tradename "Raysistor" by Ratheon Company, Newton, Mass.

As shown in FIG. 3, circuit component 88 comprises a photo-sensitive resistor 53 (adapted for connection between armature 21 and resistor 54, as shown in FIG. 2) and a light bulb 89 assembled at opposite ends of light tight casing 91. Electrical connecting means, shown at 92, are provided to connect light bulb 89 to a source of electrical voltage which, in the present invention, is the output of comparator 80. Photosensitive resistor 53 is provided with electrical connecting means, shown at 93, so that resistor 53 may be connected between armature 41 and resistor 54. In operation, variation of the voltage applied to light bulb 89 alters its illumination and thereby alters the electrical resistance of photosensitive resistor 53. It is noted that there is no electrical connection between resistor 53, unit 40 and light bulb 89 which controls its electrical resistance in response to signals received from comparator 80. Component 88, therefore, is mechanically rugged and exhibits favorable noise characteristics.

Figure 4:
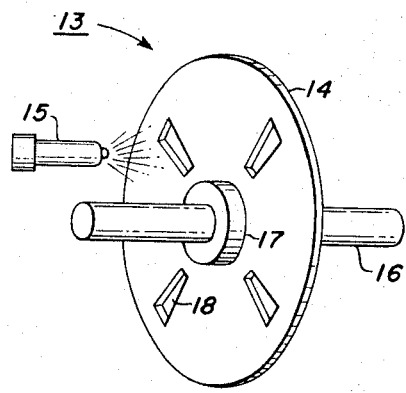

Reference is now made to FIG. 4 for a description of the means used for producing the input signals for amplifier unit 60 and 70. Means such as light chopper 13 are associated with motors 2 and 4 for the purpose of producing optical signals corresponding to their shaft rotational speeds. As illustrated, light chopper 13 comprises a slotted disc 14 and light bulb 15 supported and energized by any conventional means (not shown). Disc 14 may be mounted on the motor shaft, represented by reference numeral 16, by means of flange 17 or other suitable means. Radial slots 18, in disc 14 are equally spaced at lamp 15 is rapidly sequentially blocked and unblocked by disc 14 as the motor shaft spins, thereby producing an optical signal (approximating a square wave) of frequency corresponding to the rotational speed from shaft 16. Thus, the means illustrated, or equivalent means, may be used to produce optical signals to be fed into the amplifier units as hereinafter described.

Referring again to FIG. 2, A.C. power supply 19 is desirably used to bias the amplifier units 60 and 70 through rectifier bridge 6 and filter 7. The amplifier units are connected across the output of filter 7 by means of supply lines 8 and 9.

In unit 60, transistors 61 and 62 comprise a compound connected amplifier arrangement in which the emitter of transistor 61 is directly coupled to the base of transistor 62, and the collector of transistor 61 is directly coupled to the collector of transistor 62. Both collectors are connected to supply line 8 through bias resistor 64. Diodes 61' and 62', connected as shown, are provided for temperature compensation to prevent shifting of the operating point of transistors 61 and 62. The amplifier arrangement is connected to receive electrical output of device 63 connected across lines 8 and 9 by means of resistor 65 and capacitor 66.

Device 63 is adapted to rapidly respond to the optical speed signals, schematically represented at 3, generated by means 13 associated with master motor 2. Electrical pulses having the frequency of optical signal 3 are thereby produced and, these are integrated by capacitor 66 and the input impedance of the amplifier arrangement including transistors 61 and 62 to produce a changing D.C. level. The amplified pulsating current is used to vary the illumination of a light bulb 81 included in electro-optical component 82 of comparator 80. Light bulb 81 is electrically connected between the emitter of transistor 62 and supply lead 9, as shown.

Device 63 incorporated in the present invention desirably comprises a suitable NPN planar silicon photo device such as Type LS–400 marketed by Texas Instruments Incorporated, Dallas, Texas. The maximum dark current rating of the specific device mentioned is .025 ma. at 30 volts, and its minimum light current rating is 1.0 ma. at 5 volts.

In an embodiment of the present invention including device 63 of Type LS–400, transistor 61 of type 2N338 and transistor 62 of type 2N697, the electrical resistors associated with the amplifier unit are desirably chosen to provide a 6 volt bias for the specifically identified circuit components.

Slave amplifier unit 70 is similarly assembled and functions in the manner described to deliver electrical current signals to light bulb 81' included in electro-optical component 82' of comparator 80. Device 73, responds to optical signal 5 corresponding to the shaft rotational speed of motor 4. Accordingly, unit 70 includes device 73 connected between lines 8 and 9 by means of resistor 75 and capacitor 76. The compound connected amplifier arrangement for unit 70 comprises transistors 71 and 72 and bias resistor 74. Temperature compensating diodes 71' and 72' are included for the purpose indicated above.

Reference is now made to the details of comparator 80 where signals representing the shaft rotational speed of the motors employed in the system are electrically "compared" to produce an error signal.

As shown in FIG. 2, comparator 80 includes a resistance bridge 86, comprising resistive elements 83, 83', 84 and 85, connected across a 4 volt battery 87. Elements 84 and 85 comprise variable resistors which may be conveniently adjusted to properly balance the bridge. Elements 83 and 83' are photosensitive resistors included in electro-optical components 82 and 82', respectively, of, for example, the type identified by the reference numeral 83 in slave control unit 40.

The output of bridge 86 is taken at terminals 87' and 118, amplified by the compound connected amplifier arrangement, and fed to light bulb 89 in slave control unit 40. In the amplifier arrangement shown, the collectors of transistors 113 and 114 are connected to supply line 8 through resistor 117 selected to afford a bias of about 5 volts. Temperature compensating diodes 113' and 114' are also included.

In operation, light bulb 89 is at a null illumination until the resistance bridge 86 becomes unbalanced in response to modulations of bulbs and produced by the electrical speed signals from amplifier units 60 and 70. Unbalancing of the bridge 86, therefore, results in an error signal usable to change the speed of slave motor 4. As explained above, modulation levels of light bulb 89 alter the resistance of element 53 so that the charging time of capacitors 58 and 59 is changed. With properly selected and adjusted circuit components, therefore, the slave motor can be made to speed up or slow down for automatic speed synchronization. Thus, motors employed in the present system are operated at constant speed ratios within close tolerances.

The optical links in the system (viz., between means 13 and amplifier unit 60, between means 13' and amplifier unit 70, and between light bulb 89 and resistive element 53) enable the use of independent circuitry, as shown in FIG. 2. This highly desirable electrical isolation of the preferred embodiment obviates complex design parameters inherent in a completely electrically connected system.

The foregoing description is not intended to limit the present invention to the specific embodiments illustrated. Rather, it is intended that the appended claims be interpreted broadly to encompass the preferred embodiment and all reasonable equivalents thereof.

What is claimed is:
1. A motor speed control system comprising:
   a master motor,
   at least one direct current shunt wound electric motor,
   reference speed signal producing means adapted to continuously produce electrical signals corresponding to the shaft rotational speed of said master motor; and,
   a branch for each direct current motor comprising
   control means for connecting the direct current motor to a power supply, said control means including a light sensitive variable resistor for controlling current flow through the armature of the direct current motor,
   speed signal means adapted to continuously produce electrical signals corresponding to the shaft rotational speed of the direct current motor,
   means adapted to receive the electrical signals from the aforesaid speed signal means and from said reference speed signal producing means and produce therefrom an error signal corresponding to the deviation from a predetermined speed relationship for the direct current motor and said master motor, and,
   means to apply said error signal to said light sensitive variable resistor to change the current flow through said armature to achieve said predetermined spaced relationship.
2. A motor speed control system comprising:
   a master motor,
   at least one electric slave motor,
   means for producing a first electrical signal corresponding to the shaft rotational speed of the master motor,
   a branch for each slave motor comprising
   control means for connecting the slave motor to an electrical power supply, said means including a resistor having variable electrical resistance in accordance with incident illumination for controlling the current flow through the armature of the slave motor,
   means adapted to produce an optical signal corre- sponding to the shaft rotational speed of the slave motor, circuit means adapted to receive said optical signal and produce a second electrical signal corresponding thereto, comparator means adapted to receive said first electrical signal and said second electrical signal and produce error signals corresponding to the deviation from a predetermined speed relationship between the master motor and the slave motor, and, variable light means connected to said comparator means for varying the illumination incident on said resistor in accordance with said error signals to change its electrical resistance, whereby the armature supply current to the slave motor is varied to automatically produce said predetermined speed relationship.

3. Apparatus according to claim 2 wherein said comparator means is electrically biased to produce a null illumination in said variable light means in the absence of error signals.

4. A motor speed control system comprising:
a master motor,
at least one shunt wound direct current motor,
means for connecting the master motor to a power supply, said means including circuit means for controlling current flow through the armature of said master motor,
means for producing a first electrical signal corresponding to the shaft rotational speed of the master motor; and,
a branch for each direct current motor comprising
control means for connecting said direct current motor to a power supply, said means including a circuit element comprising a light sensitive resistor and an electric bulb within a light tight metal casing for controlling the current flow through the armature of said direct current motor,
means connected to said circuit element to maintain a null illumination in the absence of electrical error signals,
means adapted to produce an optical signal corresponding to the shaft rotational speed of said direct current motor,
circuit means adapted to receive said optical signal and produce a second electrical signal corresponding thereto,
comparator means adapted to receive said first electrical signal and said second electrical signal and produce error signals corresponding to the deviation from a predetermined speed relationship between the master motor and said direct current motor, and,
means to apply said error signals to said circuit element for varying the illumination of said electric bulb from said null illumination,
whereby the speed of the direct current motor is varied to continuously maintain said predetermined speed relationship.

5. A motor speed control system comprising:
an electric motor,
a light sensitive resistor coupled to said electric motor for varying the current flow to the motor,
electrical motor speed indicating means to produce electrical speed signals corresponding to the speed of the motor,
a terminal for receiving electrical reference signals,
a comparator coupled to said electric motor speed indicating means and said terminal for continuously comparing said speed signals with reference signals received at said terminal to produce error signals corresponding to the deviation from a predetermined ratio of the speed signals and reference signals,
a light source positioned adjacent said light sensitive resistor,
control means coupled to the output of said comparator to apply a constant null value voltage to said light source and to vary said voltage above and below said null value in accordance with said error signals received from said comparator to cause a variation in the illumination incident on said light sensitive resistor, whereby the speed of said electric motor is maintained constant relative to a speed represented by reference signals received at said terminal.

6. A motor speed control system according to claim 5 further including:
a master motor, and
master motor speed indicating means coupled to said terminal to produce electrical signals corresponding to the speed of the master motor,
said electrical signals serving as the reference signals with which said electrical speed signals are compared to produce said error signals.

7. Apparatus according to claim 6 wherein the master motor speed indicating means and electric motor speed indicating means include:
optical means to produce optical signals corresponding to the speed of a motor, and
a converter adapted to receive said optical signals and produce electrical signals corresponding thereto.

8. Apparatus according to claim 7 wherein said electric motor is a direct current shunt wound motor and said light sensitive resistor is connected in series with the armature of said electric motor.

References Cited

UNITED STATES PATENTS

| | | | |
|---|---|---|---|
| 2,599,430 | 6/1952 | Beverman | 318—329 X |
| 3,003,096 | 10/1961 | Dubois | 318—480 X |
| 3,060,415 | 10/1962 | Knudsen et al. | 318—480 X |
| 3,258,669 | 6/1966 | Krassoievitch | 318—314 |

ORIS L. RADER, *Primary Examiner.*

B. A. COOPER, *Assistant Examiner.*